(12) United States Patent
Oda et al.

(10) Patent No.: US 7,004,031 B2
(45) Date of Patent: Feb. 28, 2006

(54) ULTRASONIC SENSOR

(75) Inventors: Kiyonari Oda, Gamagori (JP); Manabu Maeda, Kariya (JP); Hisanaga Matsuoka, Okazaki (JP); Yoshihisa Sato, Nagoya (JP); Masakazu Takeichi, Okazaki (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 0 days.

(21) Appl. No.: 10/844,326

(22) Filed: May 13, 2004

(65) Prior Publication Data

US 2004/0226378 A1 Nov. 18, 2004

(30) Foreign Application Priority Data

May 16, 2003 (JP) ............................ 2003-138406

(51) Int. Cl.
*G01N 29/22* (2006.01)
*G01S 15/00* (2006.01)

(52) U.S. Cl. ..................... 73/602; 367/99; 367/901; 367/903

(58) Field of Classification Search ............... 73/602, 73/597, 620, 627, 629, 290 V; 367/903, 367/908, 99, 100–101, 135, 138, 901
See application file for complete search history.

(56) References Cited

U.S. PATENT DOCUMENTS

| | | | | |
|---|---|---|---|---|
| 4,967,860 A | | 11/1990 | Kremser | 180/169 |
| 5,179,541 A | * | 1/1993 | Weido | 367/69 |
| 5,335,545 A | * | 8/1994 | Leszczynski | 73/602 |
| 5,675,296 A | * | 10/1997 | Tomikawa | 331/158 |
| 5,768,939 A | * | 6/1998 | Quayle et al. | 73/290 V |
| 5,991,234 A | * | 11/1999 | Sejalon et al. | 367/13 |
| 6,490,226 B1 | | 12/2002 | Asakura et al. | 367/97 |
| 2003/0039173 A1 | * | 2/2003 | Yurchenko et al. | 367/903 |
| 2004/0226378 A1 | | 11/2004 | Oda et al. | 73/586 |

FOREIGN PATENT DOCUMENTS

| | | |
|---|---|---|
| DE | 35 38 964 | 5/1987 |
| JP | A-S64-1956 | 1/1989 |
| JP | A-H4-54480 | 2/1992 |
| JP | U-H4-112597 | 9/1992 |
| JP | A-H8-237796 | 9/1996 |
| JP | A-H11-103496 | 4/1999 |

* cited by examiner

*Primary Examiner*—Hezron Williams
*Assistant Examiner*—Rose M. Miller
(74) *Attorney, Agent, or Firm*—Posz Law Group, LLC

(57) ABSTRACT

An ultrasonic sensor includes a piezoelectric vibrator, a reverberation measuring device and a compensating device. The piezoelectric vibrator vibrates to transmit an ultrasonic wave, receives a reflected wave of the transmitted ultrasonic wave and produces an output signal corresponding to vibration of the piezoelectric vibrator. The reverberation measuring device measures a reverberation period of the piezoelectric vibrator from the output signal. The compensating device compensates for an operation characteristic of the piezoelectric vibrator in accordance with the measured reverberation period. Thus, the ultrasonic sensor can decrease a reverberation period, which may cause reduction in detection accuracy and impossibility of detection of an obstacle at a short distance.

24 Claims, 4 Drawing Sheets

SWITCH ON/OFF

ULTRASONIC SENSOR

CROSS REFERENCE TO RELATED APPLICATION

This application is based on Japanese Patent Application No. 2003-138406 filed on May 16, 2003, the disclosure of which is incorporated herein by reference.

BACKGROUND OF THE INVENTION

1. Field of the Invention

The present invention relates to an ultrasonic sensor which is used for a vehicle and the like.

2. Description of Related Art

An ultrasonic sensor is used as an obstacle detection sensor for detecting obstacle by transmitting and receiving an ultrasonic wave. This ultrasonic sensor has a piezoelectric vibrator. The piezoelectric vibrator vibrates to transmit an ultrasonic wave and receives a reflected wave from an obstacle, so that an obstacle can be detected.

However, the above ultrasonic sensor has a disadvantage that a reverberation occurs after normal vibration of the piezoelectric vibrator. Therefore, detection accuracy of the sensor may be reduced and the ultrasonic sensor may not be able to detect an obstacle at a short distance if the reverberation continues long.

In order to adjust the reverberation period to be within a suitable range, a capacitor to compensate for an electric capacity of the piezoelectric vibrator can be used.

Figure 8:
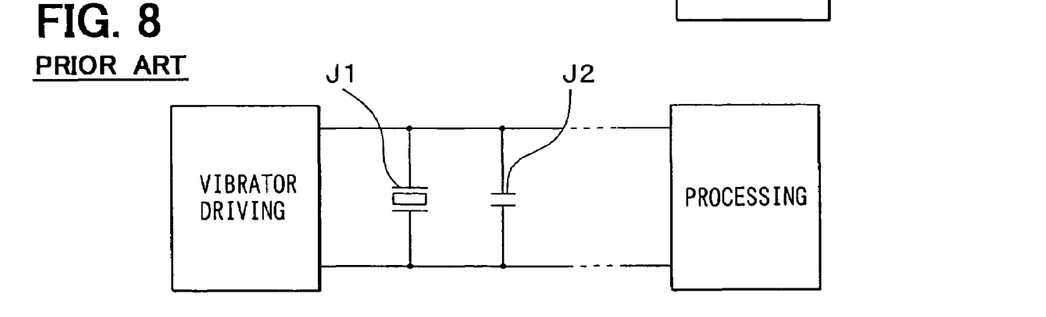
FIG. 8 is a circuit diagram of an ultrasonic sensor according to a prior art.

In JP-A-H8-237796, as shown in FIG. 8, an ultrasonic sensor has a capacitor J2 connected in parallel with a piezoelectric vibrator J1 in order to reduce a temperature drift of a sensor output. When a temperature of the ultrasonic sensor changes, an electric capacity of the capacitor J2 changes in the opposite direction of an electric capacity change of the piezoelectric vibrator J1. That is, the electric capacity change of the piezoelectric vibrator J1 can be cancelled.

However, characteristics of the piezoelectric vibrator J1 and the capacitor J2 are uneven. Therefore, an increase amount of electric capacity of the piezoelectric vibrator J1 and a decrease amount of electric capacity of the capacitor J2 are not equal. Accordingly, a temperature compensation cannot be performed correctly and a temperature drift occurs. Further, a temperature range to compensate for electric capacity may be limited according to characteristics of the capacitor J2. Therefore, the technique disclosed in JP-A-H8-237796 is not satisfactory to adjust a reverberation period.

In JP-A-H11-103496, an ultrasonic sensor has a capacitor alternately connected and disconnected in parallel with a piezoelectric vibrator in order to improve a sound pressure of an ultrasonic wave to be transmitted and a sensitivity to a reflected wave. The capacitor is connected when the piezoelectric vibrator transmits an ultrasonic wave. To the contrary, the capacitor is disconnected when the piezoelectric vibrator receives a reflected wave. Thus, a resonance frequency and an anti-resonance frequency are changed to improve a sound pressure of an ultrasonic wave to be transmitted and a sensitivity to a reflected wave. However, a reverberation period cannot be suitably adjusted only by connecting or disconnecting a capacitor. Therefore, the technique disclosed in JP-A-H11-103496 is not satisfactory to adjust a reverberation period.

SUMMARY OF THE INVENTION

In view of the foregoing problems, it is an object of the present invention to provide an ultrasonic sensor which can compensate for an electric capacity of a piezoelectric vibrator in order to adjust a reverberation period to be within a suitable range.

In order to achieve the above object, an ultrasonic sensor includes a piezoelectric vibrator, a reverberation measuring means and a compensating means.

The piezoelectric vibrator vibrates to transmit an ultrasonic wave, receives a reflected wave of the transmitted ultrasonic wave and produces an output signal corresponding to vibration of the piezoelectric vibrator. The reverberation measuring means measures a reverberation period of the piezoelectric vibrator from the output signal. The compensating means compensates for an operation characteristic of the piezoelectric vibrator in accordance with the measured reverberation period.

Thus, the ultrasonic sensor can compensate for electric capacity of the piezoelectric vibrator and the reverberation period can be adjusted to be within a predetermined range. Accordingly, the ultrasonic sensor can decrease a reverberation period, which may cause reduction in detection accuracy and impossibility of detection of an obstacle at a short distance.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS (First Embodiment)

Figure 1:
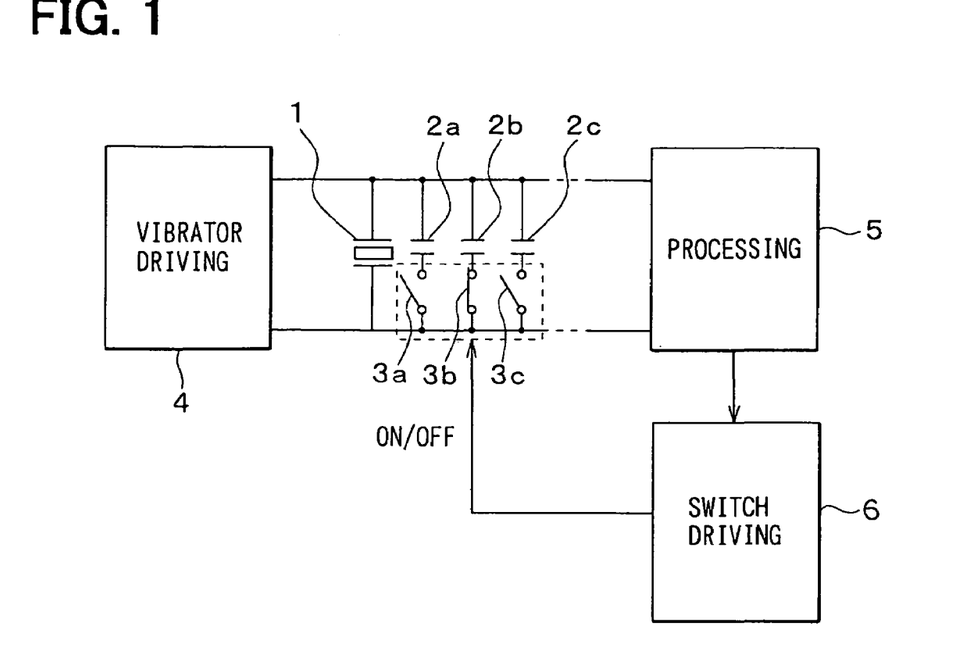
FIG. 1 is a circuit diagram of an ultrasonic sensor according to a first embodiment of the present invention.

In FIG. 1, an ultrasonic sensor is applied as an obstacle detection sensor for both transmitting and receiving an ultrasonic wave. For example, this obstacle detection sensor is mounted in a vehicle and detects an obstacle near the corners of the vehicle. This obstacle detection sensor transmits an ultrasonic wave from a piezoelectric vibrator 1 and receives a reflected wave from an obstacle corresponding to a detection object. Thus, this obstacle detection sensor detects an existence of an obstacle.

The ultrasonic sensor includes the piezoelectric vibrator 1, multiple capacitors 2a, 2b and 2c as capacitive components, multiple switches 3a, 3b and 3c, a vibrator driving circuit 4, an output signal processing circuit 5 and a switch driving circuit 6.

The piezoelectric vibrator 1 is attached to a housing (not shown). The piezoelectric vibrator 1 vibrates to transmit an ultrasonic wave and receives a reflected wave from an obstacle. An output signal corresponding to vibration of the piezoelectric vibrator 1 is outputted to the output signal processing circuit 5.

The capacitors 2a–2c are used to compensate for a change of electric capacity of the piezoelectric vibrator 1 based on a temperature change or a difference of resonance characteristics based on product unevenness. Each of the capacitors 2a–2c is connected in parallel with the piezoelectric vibrator 1. Although three capacitors are used in the first embodiment, the number of capacitors is not limited particularly. An electric capacity of each of the capacitors 2a–2c is determined according to electric capacity characteristics of the piezoelectric vibrator 1. Here, it is not important whether electric capacities of the capacitors 2a–2c are the same or not.

The switches 3a–3c are connected in series with the capacitors 2a–2c respectively and are driven to ON or OFF by the switch driving circuit 6. Thus, the capacitors 2a–2c can be connected to or disconnected from the piezoelectric vibrator 1.

The vibrator driving circuit 4 drives the piezoelectric vibrator 1. Specifically, the vibrator driving circuit 4 applies a voltage at a predetermined level to the piezoelectric vibrator 1 and causes the piezoelectric vibrator 1 to vibrate and transmit an ultrasonic wave.

The piezoelectric vibrator 1 receives a reflected wave from an obstacle and vibrates. An output signal corresponding to vibration of the piezoelectric vibrator 1 is outputted to the output signal processing circuit 5. The output signal processing circuit 5 amplifies the output signal because it is attenuated to be lower than the voltage applied to the piezoelectric vibrator 1 by the vibrator driving circuit 4. Thereafter, the output signal processing circuit 5 performs various calculations to output a sensor output signal of the ultrasonic sensor. For example, the sensor output signal is inputted to an alarming buzzer driving circuit. The alarming buzzer driving circuit determines an existence of an obstacle or a distance to an obstacle and performs a processing such as sounding the alarming buzzer.

Furthermore, in the first embodiment, the output signal processing circuit 5 measures a reverberation period of the output signal from the piezoelectric vibrator 1. In order to measure the reverberation period, for example, a timer is provided in the output signal processing circuit 5. When the measured reverberation period exceeds a predetermined threshold time, the output signal processing circuit 5 determines a combination of ON/OFF condition of the switches 3a–3c in order to adjust the reverberation period to be shorter than the predetermined threshold time. In order to determine the combination of ON/OFF condition of the switches 3a–3c, for example, the output signal processing circuit 5 stores a switch control characteristic in advance. The switch control characteristic is a relationship between the measured reverberation period and the combination of ON/OFF condition of the switches 3a–3c, which is to be selected at the corresponding measured reverberation period. The output signal processing circuit 5 determines the combination of ON/OFF condition of the switches 3a–3c according to the measured reverberation period based on the switch control characteristic. The output signal processing circuit 5 outputs a switch condition signal, which represents the determined combination of ON/OFF condition of the switches 3a–3c, to the switch driving circuit 6.

The switch driving circuit 6 drives the switches 3a–3c to ON or OFF based on the switch condition signal from the output signal processing circuit 5. Thus, each of the capacitors 2a–2c is connected to or disconnected from the piezoelectric vibrator 1. Therefore, a compensation for electric capacity of the piezoelectric vibrator 1 is performed and a reverberation period can be adjusted to be shorter than the predetermined threshold time.

Figure 2:
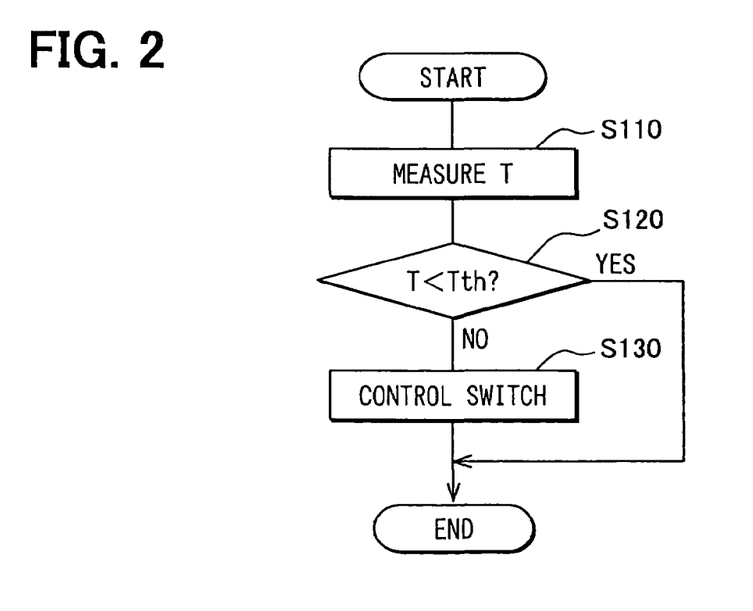
FIG. 2 is a flow diagram of adjusting processing of a reverberation period in the ultrasonic sensor according to the first embodiment.

Specifically, as shown in FIG. 2, the following adjusting processing is performed by the output signal processing circuit 5 in order to adjust a reverberation period.

First, at step S110, a reverberation period T is measured by the output signal processing circuit 5. Before the reverberation period T is measured, as described above, the piezoelectric vibrator 1 transmits an ultrasonic wave, receives a reflected wave from an obstacle and vibrates. The piezoelectric vibrator 1 outputs an output signal corresponding to vibration of the piezoelectric vibrator 1 to the output signal processing circuit 5. The output signal processing circuit 5 amplifies the output signal. By using a timer or the like, the output signal processing circuit 5 measures a time it takes for the amplified output signal to be attenuated to be a predetermined magnitude. The measured time is the reverberation period T.

Next, at step S120, it is decided whether the reverberation period T is longer than a predetermined threshold time Tth. Here, the predetermined threshold time Tth depends on a structure of the ultrasonic sensor, a place where the ultrasonic sensor is used and the like. Specifically, the predetermined threshold time Tth is set in a range that a reverberation in an obstacle detection does not affect a subsequent obstacle detection. For example, when the ultrasonic sensor is used as a corner sonar of a vehicle, the predetermined threshold time Tth is set to be in a range from 1 ms to 2 ms, preferably, lower than 1.4 ms.

When it is decided that the reverberation period T is shorter than the predetermined threshold time Tth at step S120, the adjusting processing is immediately finished. That is, the output signal processing circuit 5 does not output a switch condition signal to the switch driving circuit 6 and an ON/OFF condition of the switches 3a–3c is not changed.

When it is decided that the reverberation period T is longer than the predetermined threshold time Tth at step S120, the adjusting processing proceeds to step S130. That is, the output signal processing circuit 5 outputs a switch condition signal to the switch driving circuit 6 and an ON/OFF condition of the switches 3a–3c is changed. As described above, the switch condition signal is determined based on the switch control characteristic by the output signal processing circuit 5. The switch condition signal, that is, a determination whether the number of capacitors connected to the piezoelectric vibrator 1 is increased or decreased depends on a resonance characteristic of the piezoelectric vibrator 1. Specifically, the number of capacitors is determined so that a resonance characteristic of the circuit including the piezoelectric vibrator 1 and the capacitors becomes a resonance characteristic for attenuating a signal of the same frequency as that of the output signal from the piezoelectric vibrator 1.

When the ON/OFF condition of the switches 3a–3c is performed at step S130, a combined electric capacity of the capacitors 2a–2c is changed and a reverberation period is also changed.

Thereafter, the adjusting processing is finished once and is started again from step S110. That is, the reverberation period T is measured again. Then, it is decided again whether the measured reverberation period T is longer than the predetermined threshold time Tth at step S120.

When it is decided that the measured reverberation period T is shorter than the predetermined threshold time Tth at step S120, it is decided that adjustment of reverberation period is successful. Therefore, the adjusting processing is finished. To the contrary, when it is decided that the measured reverberation period T is longer than the predetermined threshold time Tth at step S120, the adjusting processing proceeds to step S130 and the above processing is repeated until the measured reverberation period T is adjusted to be shorter than the predetermined threshold time Tth.

Figure 3A:
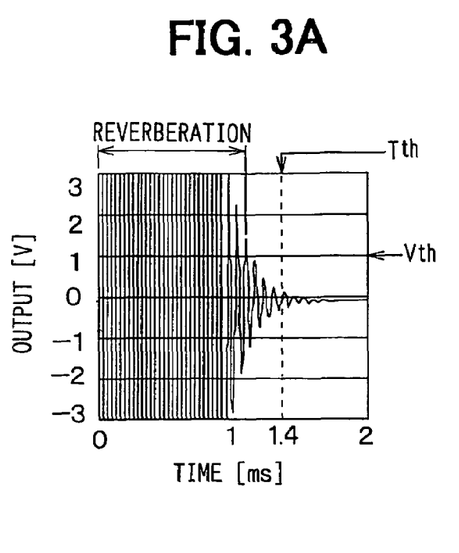
FIG. 3A is a waveform diagram of an output signal from a piezoelectric vibrator when a reverberation period does not exceed a predetermined threshold time Tth and FIG. 3B is a waveform diagram of an output signal when a reverberation period exceeds the predetermined threshold time Tth.
Figure 3B:
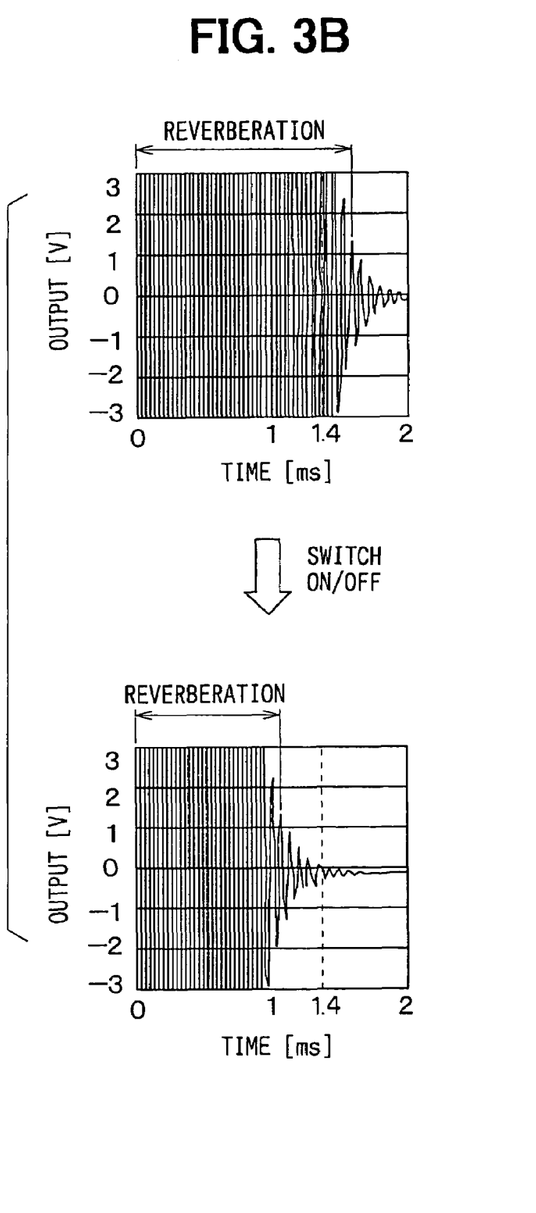

In waveform diagrams in FIGS. 3A and 3B, the predetermined threshold time Tth is set to be 1.4 ms and the predetermined magnitude Vth to decide a reverberation period is set to be 1V. When a reverberation period is shorter than the predetermined threshold time Tth (=1.4 ms) as shown in FIG. 3A, the ON/OFF condition of the switches 3a–3c is not changed and a connection condition of the capacitors 2a–2c is not changed.

When a reverberation period is longer than the predetermined threshold time Tth (=1.4 ms) as shown in FIG. 3B, the ON/OFF condition of the switches 3a–3c is changed and a connection condition of the capacitors 2a–2c is changed. Thus, a reverberation period can be reduced as shown in the waveform diagram.

As described above, the switch driving circuit 6 changed the ON/OFF condition of the switches 3a–3c and a combination of the capacitors 2a–2c connected to the piezoelectric vibrator 1 is changed. Thus, a compensation for electric capacity of the piezoelectric vibrator 1 can be performed and a reverberation period can be adjusted to be shorter than a predetermined threshold time. Accordingly, the ultrasonic sensor can restrict increase of a reverberation period, which will cause reduction in detection accuracy and impossibility of detection of an obstacle at a short distance.

Further, a timing for changing the ON/OFF condition of the switches 3a–3c by the switch driving circuit 6 is not explained above. However, a timing that a function of the ultrasonic sensor is not affected is preferable. That is, a timing that the ultrasonic sensor is to be driven is avoided. For example, when the ultrasonic sensor is used as a vehicle sonar, the ultrasonic sensor is to be driven when the vehicle is put into a garage. Therefore, when a vehicle speed is more than 20 km/h, it is not decided to be a timing that the ultrasonic sensor is to be driven and the above ON/OFF condition is changed. Further, when the ultrasonic sensor is mounted at a vehicle front side, it is preferable that the ON/OFF condition of the switches 3a–3c is changed when the vehicle goes back. To the contrary, when the ultrasonic sensor is mounted at a vehicle rear side, it is preferable that the ON/OFF condition of the switches 3a–3c is changed when the vehicle goes forward.

Further, in the first embodiment, a reverberation period is adjusted to be shorter than a predetermined threshold time. To the contrary, it is possible that upper and lower limits of reverberation period are set. In this case, when a reverberation period is longer than the upper limit or is shorter than the lower limit, it is decided that adjustment is impossible and, for example, an alarming buzzer is sounded. Thus, when a change of a reverberation period becomes larger, for example, in case where a wire in a sensor circuit is broken or the ultrasonic sensor is frozen, an abnormality of the ultrasonic sensor can be alarmed.

(Second Embodiment)

Figure 4:
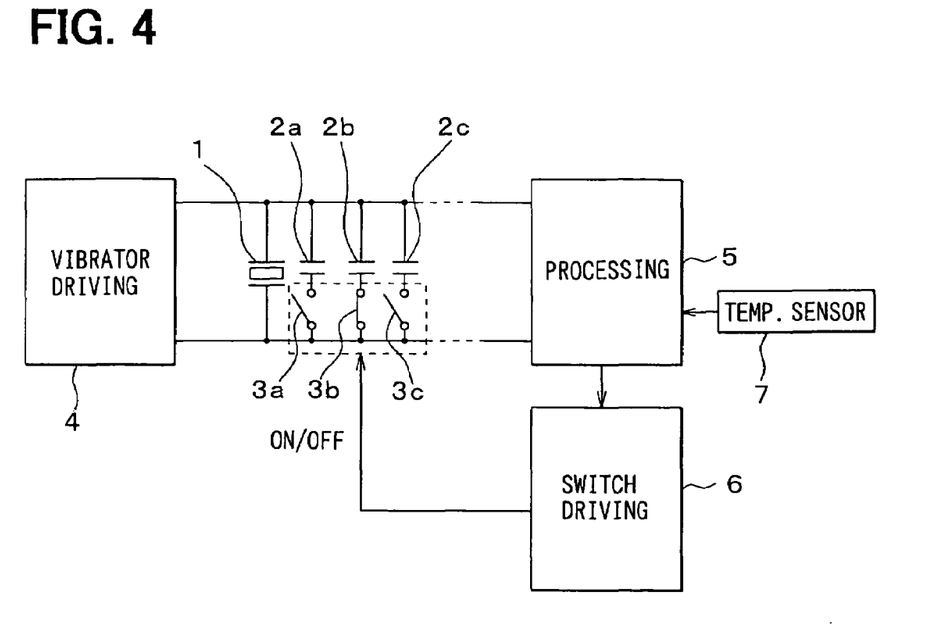
FIG. 4 is a circuit diagram of an ultrasonic sensor according to a second embodiment of the present invention.

As shown in FIG. 4, an ultrasonic sensor according to the second embodiment is different from that of the first embodiment in the following point. That is, a temperature sensor 7 is provided in order to estimate a temperature of the ultrasonic sensor. A temperature output signal from the temperature sensor 7 is inputted to the output signal processing circuit 5.

A position where the temperature sensor 7 is mounted is not limited particularly. However, it is required that a temperature in the position where the temperature sensor 7 is mounted correlates with a temperature in a position where the ultrasonic sensor is mounted. That is, it is preferable that the temperature sensor 7 is mounted near the ultrasonic sensor.

In the second embodiment, the output signal processing circuit 5 stores a switch control characteristic for temperature compensation in advance. The switch control characteristic for temperature compensation is a relationship between the estimated temperature of the ultrasonic sensor based on the temperature detected by the temperature sensor 7 and the combination of ON/OFF condition of the switches 3a–3c, which is to be selected at the corresponding estimated temperature of the ultrasonic sensor. The output signal processing circuit 5 determines the combination of ON/OFF condition of the switches 3a–3c according to the estimated temperature based on the switch control characteristic for temperature compensation. The output signal processing circuit 5 outputs a switch condition signal, which represents the determined combination of ON/OFF condition of the switches 3a–3c, to the switch driving circuit 6.

Specifically, the switch condition signal, that is, a determination whether the number of capacitors connected to the piezoelectric vibrator 1 is increased or decreased depends on a temperature characteristic of the piezoelectric vibrator 1. That is, a resonance characteristic of the piezoelectric vibrator 1 changes when a temperature of the piezoelectric vibrator 1 changes. Accordingly, the resonance characteristic is adjusted by changing the number of capacitors connected to the piezoelectric vibrator 1. Specifically, the number of capacitors is determined so that a resonance characteristic of the circuit including the piezoelectric vibrator 1 and the capacitors becomes a resonance characteristic for attenuating a signal of the same frequency as that of the output signal from the piezoelectric vibrator 1.

Thus, even when electric capacity of the piezoelectric vibrator 1 changes according to a temperature change and resonance characteristic is changed, a combination of the connected capacitors can be changed. Accordingly, a reverberation period can be adjusted even when a temperature of the ultrasonic sensor changes.

(Third Embodiment)

Figure 5:
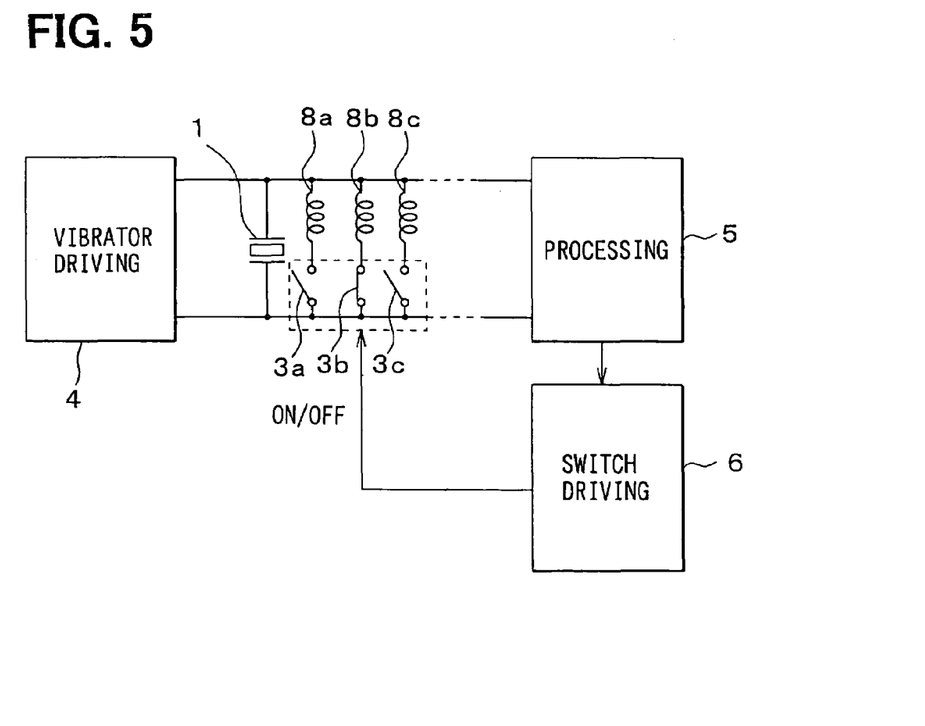
FIG. 5 is a circuit diagram of an ultrasonic sensor according to a third embodiment of the present invention.

As shown in FIG. 5, an ultrasonic sensor according to the third embodiment has multiple coils 8a–8c instead of the multiple capacitors 2a–2c in the above embodiments. Similarly to the above embodiments, the coils 8a–8c can also compensate for electric capacity of the piezoelectric vibrator 1.

(Fourth Embodiment)

Figure 6:
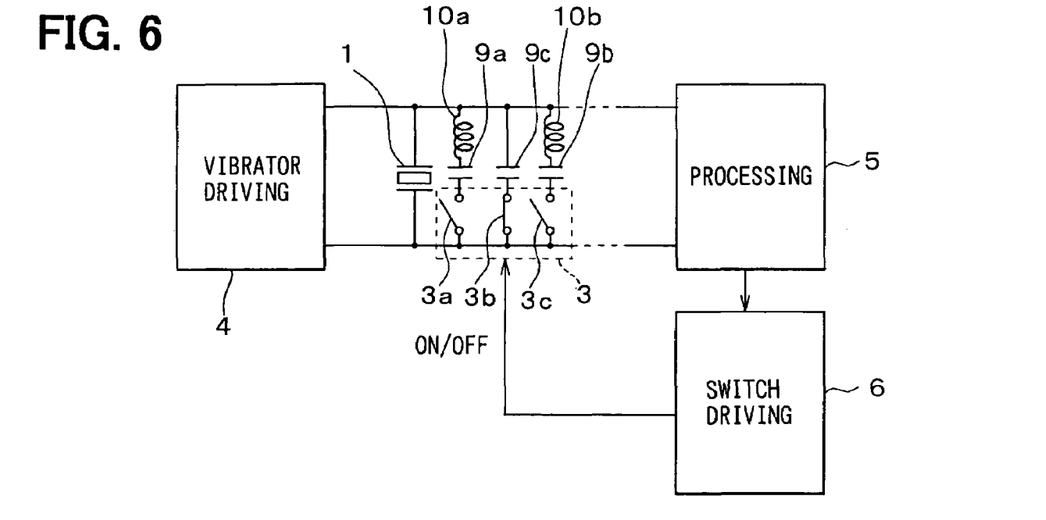
FIG. 6 is a circuit diagram of an ultrasonic sensor according to a fourth embodiment of the present invention.

As shown in FIG. 6, an ultrasonic sensor according to the fourth embodiment has capacitors 9a–9c and coils 10a, 10b instead of the multiple capacitors 2a–2c in the first and second embodiments. The capacitor 9a and the coil 10a are connected in series and both of them are connected in parallel with the piezoelectric vibrator 1. Similarly, the capacitor 9b and the coil 10b are also connected as described above. The capacitor 9c is connected in parallel with the piezoelectric vibrator 1.

Similarly to the above embodiments, the above combination of the capacitors 9a–9c and the coils 10a, 10b can also compensate for electric capacity of the piezoelectric vibrator 1. Further, the above combination of the capacitors and the coils is merely an example. The combination of capacitors and coils can be changed according to an electric capacity of each capacitor and an inductance of each coil.

(Other Embodiments)

In the above embodiments, the ON/OFF condition of the switches 3a–3c is changed in order to adjust a reverberation period of the output signal from the piezoelectric vibrator 1 only when the reverberation period exceeds a predetermined threshold time. However, it is possible that the ON/OFF condition of the switches 3a–3c is normally changed in order to adjust a reverberation period to be the shortest. In this case, the output signal processing circuit 5 normally outputs a switch condition signal according to the output signal from the piezoelectric vibrator 1. Based on the above switch condition signal, the switch driving circuit 6 changes ON/OFF condition of the switches 3a–3c.

Further, in the above embodiments, the output signal processing circuit 5 stores the switch control characteristic in advance. The output signal processing circuit 5 determines a combination of ON/OFF condition of the switches 3a–3c based on the switch control characteristic. To the contrary, it is possible that the ON/OFF condition is actually changed for all of possible combinations of ON/OFF condition of the switches 3a–3c in order to obtain the shortest reverberation period. In this case, the output signal processing circuit 5 measures a reverberation period for all of possible combinations of ON/OFF condition of the switches 3a–3c. The output signal processing circuit 5 selects a combination with the shortest reverberation period from all of the possible combinations.

The ultrasonic sensor according to the second embodiment is an ultrasonic sensor that the temperature sensor 7 is added to the ultrasonic sensor according to the first embodiment. However, the ultrasonic sensor according to the second embodiment can be applied to that of the third or fourth embodiment.

In the above embodiments, the capacitors 2a–2c, 9a–9c and the coils 8a–8c, 10a, 10b are connected in parallel with the piezoelectric vibrator 1. However, it is possible that these are connected in series with the piezoelectric vibrator 1. In this case, a switch is connected in parallel with each of the capacitors and the coils. When the switch is turned on, current does not flow in corresponding one of the capacitors and the coils. That is, each of the capacitors and the coils is bypassed.

Figure 7:
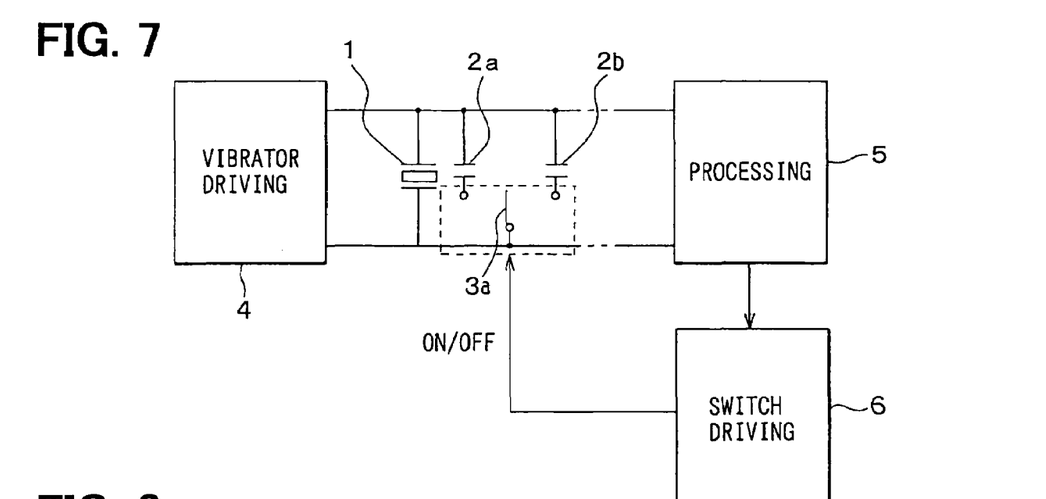
FIG. 7 is a circuit diagram of an ultrasonic sensor having a single switch for ON/OFF of capacitor.

In the above embodiments, the multiple switches 3a–3c are used for changing the ON/OFF condition of the capacitors or the coils. However, as shown in FIG. 7, it is possible that a single switch is used for changing the ON/OFF condition of the capacitors or the coils.

What is claimed is:

1. An ultrasonic sensor comprising:
   a piezoelectric vibrator which vibrates to transmit an ultrasonic wave, receives a reflected wave of the transmitted ultrasonic wave and produces an output signal corresponding to vibration of the piezoelectric vibrator;
   a reverberation measuring means for measuring a reverberation period of the piezoelectric vibrator from the output signal; and
   a compensating means for compensating for an operation characteristic of the piezoelectric vibrator in accordance with the measured reverberation period, wherein
   the compensating means compensates for the operation characteristic of the piezoelectric vibrator so that the reverberation period is adjusted to be the shortest when the reverberation period measured by the reverberation measuring means is not within a predetermined range.

2. The ultrasonic sensor according to claim 1, further comprising:
   a temperature sensor for detecting a temperature in a place where the piezoelectric vibrator is disposed,
   wherein the compensating means compensates for the operation characteristic of the piezoelectric vibrator in accordance with the reverberation period measured by the reverberation measuring means and the temperature detected by the temperature sensor.

3. The ultrasonic sensor according to claim 1, wherein:
   the compensating means includes a plurality of capacitors; and
   the compensating means compensates for the operation characteristic of the piezoelectric vibrator by changing a combination of the plurality of capacitors which are connected to the piezoelectric vibrator.

4. The ultrasonic sensor according to claim 1, wherein:
   the compensating means includes a plurality of coils; and
   the compensating means compensates for the operation characteristic of the piezoelectric vibrator by changing a combination of the plurality of coils which are connected to the piezoelectric vibrator.

5. An ultrasonic sensor comprising:
   a piezoelectric vibrator which vibrates to transmit an ultrasonic wave, receives a reflected wave of the transmitted ultrasonic wave and produces an output signal corresponding to vibration of the piezoelectric vibrator;
   a reverberation measuring means for measuring a reverberation period of the piezoelectric vibrator from the output signal; and
   a compensating means for compensating for an operation characteristic of the piezoelectric vibrator in accordance with the measured reverberation period, wherein
   the compensating means normally compensates for the operation characteristic of the piezoelectric vibrator so that the reverberation period is adjusted to be the shortest.

6. The ultrasonic sensor according to claim 5, further comprising:
   a temperature sensor for detecting a temperature in a place where the piezoelectric vibrator is disposed,
   wherein the compensating means compensates for the operation characteristic of the piezoelectric vibrator in accordance with the reverberation period measured by the reverberation measuring means and the temperature detected by the temperature sensor.

7. The ultrasonic sensor according to claim 5, wherein:
   the compensating means includes a plurality of capacitors; and
   the compensating means compensates for the operation characteristic of the piezoelectric vibrator by changing a combination of the plurality of capacitors which are connected to the piezoelectric vibrator.

8. The ultrasonic sensor according to claim 5, wherein:
   the compensating means includes a plurality of coils; and
   the compensating means compensates for the operation characteristic of the piezoelectric vibrator by changing a combination of the plurality of coils which are connected to the piezoelectric vibrator.

9. An ultrasonic sensor comprising:
a piezoelectric vibrator which vibrates to transmit an ultrasonic wave, receives a reflected wave of the transmitted ultrasonic wave and produces an output signal corresponding to vibration of the piezoelectric vibrator;
a reverberation measuring means for measuring a reverberation period of the piezoelectric vibrator from the output signal; and
a compensating means for compensating for an operation characteristic of the piezoelectric vibrator in accordance with the measured reverberation period, wherein:
the compensating means includes at least one of a capacitor and a coil;
the compensating means compensates for the operation characteristic of the piezoelectric vibrator by changing a combination of the capacitor and the coil which are connected to the piezoelectric vibrator;
the reverberation measuring means measures a reverberation period of the piezoelectric vibrator for all or some of combinations of the capacitor and the coil which are connected to the piezoelectric vibrator; and
the compensating means selects a combination from the combinations of the capacitor and the coil connected to the piezoelectric vibrator, whose reverberation periods are measured by the reverberation measuring means.

10. The ultrasonic sensor according to claim 9, further comprising:
a temperature sensor for detecting a temperature in a place where the piezoelectric vibrator is disposed,
wherein the compensating means compensates for the operation characteristic of the piezoelectric vibrator in accordance with the reverberation period measured by the reverberation measuring means and the temperature detected by the temperature sensor.

11. The ultrasonic sensor according to claim 9, wherein:
the compensating means includes a plurality of capacitors; and
the compensating means compensates for the operation characteristic of the piezoelectric vibrator by changing a combination of the plurality of capacitors which are connected to the piezoelectric vibrator.

12. The ultrasonic sensor according to claim 9, wherein:
the compensating means includes a plurality of coils; and
the compensating means compensates for the operation characteristic of the piezoelectric vibrator by changing a combination of the plurality of coils which are connected to the piezoelectric vibrator.

13. An ultrasonic sensor comprising:
a piezoelectric vibrator which vibrates to transmit an ultrasonic wave, receives a reflected wave of the transmitted ultrasonic wave and produces an output signal corresponding to vibration of the piezoelectric vibrator;
a reverberation measuring means for measuring a reverberation period of the piezoelectric vibrator from the output signal; and
a compensating means for compensating for an operation characteristic of the piezoelectric vibrator in accordance with the measured reverberation period, wherein:
the compensating means includes at least one of a capacitor and a coil;
the compensating means compensates for the operation characteristic of the piezoelectric vibrator by changing a combination of the capacitor and the coil which are connected to the piezoelectric vibrator;
the ultrasonic sensor is mounted in a vehicle in order to detect an obstacle around the vehicle; and
the compensating means changes the combination of the capacitor and the coil connected to the piezoelectric vibrator when a speed of the vehicle is more than a predetermined value.

14. The ultrasonic sensor according to claim 13, further comprising:
a temperature sensor for detecting a temperature in a place where the piezoelectric vibrator is disposed,
wherein the compensating means compensates for the operation characteristic of the piezoelectric vibrator in accordance with the reverberation period measured by the reverberation measuring means and the temperature detected by the temperature sensor.

15. The ultrasonic sensor according to claim 13, wherein:
the compensating means includes a plurality of capacitors; and
the compensating means compensates for the operation characteristic of the piezoelectric vibrator by changing a combination of the plurality of capacitors which are connected to the piezoelectric vibrator.

16. The ultrasonic sensor according to claim 13, wherein:
the compensating means includes a plurality of coils; and
the compensating means compensates for the operation characteristic of the piezoelectric vibrator by changing a combination of the plurality of coils which are connected to the piezoelectric vibrator.

17. An ultrasonic sensor comprising:
a piezoelectric vibrator which vibrates to transmit an ultrasonic wave, receives a reflected wave of the transmitted ultrasonic wave and produces an output signal corresponding to vibration of the piezoelectric vibrator;
a reverberation measuring means for measuring a reverberation period of the piezoelectric vibrator from the output signal; and
a compensating means for compensating for an operation characteristic of the piezoelectric vibrator in accordance with the measured reverberation period, wherein:
the compensating means includes at least one of a capacitor and a coil; and
the compensating means compensates for the operation characteristic of the piezoelectric vibrator by changing a combination of the capacitor and the coil which are connected to the piezoelectric vibrator;
the ultrasonic sensor is mounted on a front side of a vehicle in order to detect an obstacle in front of the vehicle; and
the compensating means changes the combination of the capacitor and the coil connected to the piezoelectric vibrator when the vehicle moves back.

18. The ultrasonic sensor according to claim 17, further comprising:
a temperature sensor for detecting a temperature in a place where the piezoelectric vibrator is disposed,
wherein the compensating means compensates for the operation characteristic of the piezoelectric vibrator in accordance with the reverberation period measured by the reverberation measuring means and the temperature detected by the temperature sensor.

19. The ultrasonic sensor according to claim 17, wherein:
the compensating means includes a plurality of capacitors; and
the compensating means compensates for the operation characteristic of the piezoelectric vibrator by changing a combination of the plurality of capacitors which are connected to the piezoelectric vibrator.

20. The ultrasonic sensor according to claim 17, wherein:
the compensating means includes a plurality of coils; and the compensating means compensates for the operation characteristic of the piezoelectric vibrator by changing a combination of the plurality of coils which are connected to the piezoelectric vibrator.

21. An ultrasonic sensor comprising:
a piezoelectric vibrator which vibrates to transmit an ultrasonic wave, receives a reflected wave of the transmitted ultrasonic wave and produces an output signal corresponding to vibration of the piezoelectric vibrator;
a reverberation measuring means for measuring a reverberation period of the piezoelectric vibrator from the output signal; and
a compensating means for compensating for an operation characteristic of the piezoelectric vibrator in accordance with the measured reverberation period, wherein:
the compensating means includes at least one of a capacitor and a coil; and
the compensating means compensates for the operation characteristic of the piezoelectric vibrator by changing a combination of the capacitor and the coil which are connected to the piezoelectric vibrator;
the ultrasonic sensor is mounted on a rear side of a vehicle in order to detect an obstacle behind the vehicle; and
the compensating means changes the combination of the capacitor and the coil connected to the piezoelectric vibrator when the vehicle moves forward.

22. The ultrasonic sensor according to claim 21, further comprising:
a temperature sensor for detecting a temperature in a place where the piezoelectric vibrator is disposed,
wherein the compensating means compensates for the operation characteristic of the piezoelectric vibrator in accordance with the reverberation period measured by the reverberation measuring means and the temperature detected by the temperature sensor.

23. The ultrasonic sensor according to claim 21, wherein:
the compensating means includes a plurality of capacitors; and
the compensating means compensates for the operation characteristic of the piezoelectric vibrator by changing a combination of the plurality of capacitors which are connected to the piezoelectric vibrator.

24. The ultrasonic sensor according to claim 21, wherein:
the compensating means includes a plurality of coils; and
the compensating means compensates for the operation characteristic of the piezoelectric vibrator by changing a combination of the plurality of coils which are connected to the piezoelectric vibrator.

* * * * *